United States Patent

Korn

[15] 3,673,339

[45] June 27, 1972

[54] ARTIFICIAL LINE BUSY CIRCUIT

[72] Inventor: Franklin Adam Korn, Columbus, Ohio

[73] Assignee: Bell Telephone Laboratories, Incorporated, Murray Hill, N.J.

[22] Filed: July 22, 1970

[21] Appl. No.: 57,036

[52] U.S. Cl. ........................179/18 F, 179/18 AB, 179/81 R

[51] Int. Cl. ........................H04m 1/00

[58] Field of Search...............179/18 F, 18 FA, 16 A, 16 AA, 179/18 AB, 18 B, 81 R

[56] References Cited

UNITED STATES PATENTS

| | | | |
|---|---|---|---|
| 2,574,224 | 11/1951 | Oberman | 179/16 AA |
| 3,176,078 | 3/1965 | Warman | 179/18 F |
| 2,785,229 | 3/1957 | Faulkner | 179/18 F |

*Primary Examiner*—Kathleen H. Claffy
*Assistant Examiner*—Thomas W. Brown
*Attorney*—R. J. Guenther and James Warren Falk

[57] ABSTRACT

Auxiliary line circuitry is disclosed for making a customer telephone line appear busy for timed periods and only in response to incoming calls. The circuitry is activated by incoming call ringing for connecting a bridge network to the customer line for applying a busy tone thereto, immediately tripping ringing and retaining a timed off-hook signal on the line following a calling party disconnect. Thereafter, the bridge network causes a permanent signal to be automatically originated for making the customer phone appear busy for a period controlled by timers in the auxiliary line circuitry.

10 Claims, 1 Drawing Figure

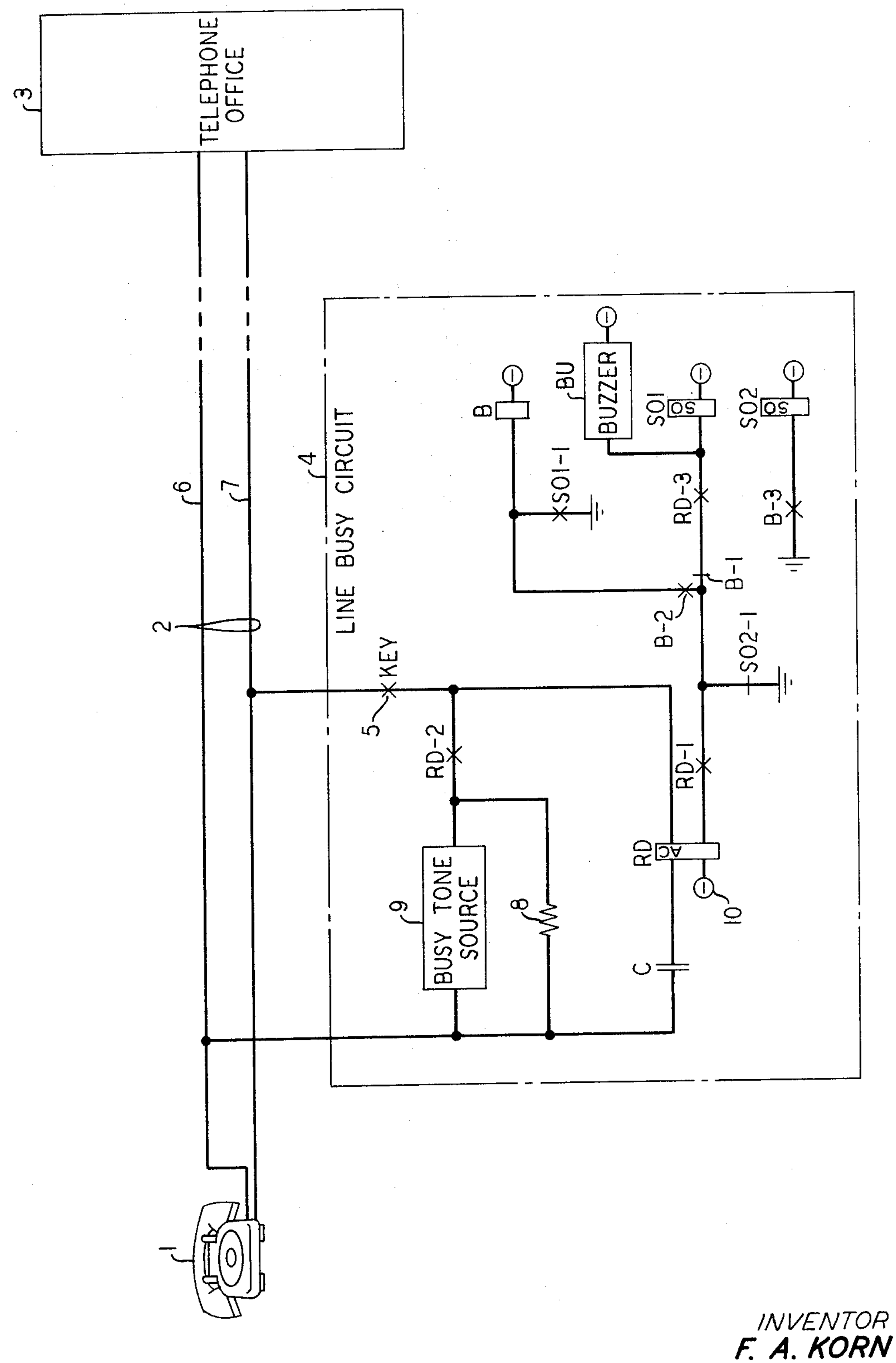
INVENTOR
F. A. KORN
BY
Frederick W. Padden
ATTORNEY

ARTIFICIAL LINE BUSY CIRCUIT

BACKGROUND OF THE INVENTION

This invention relates to communication line circuits and particularly to auxiliary circuitry for use in conjunction with telephone line circuits for reducing permanent signal conditions generated by customers who deliberately leave their phones off-hook when they are absent from their premises.

Available information indicates that an unlawful breaking and entry into an unoccupied home or business building is often preceded by a telephone call from the would-be intruder. If the called station fails to answer, the intruder determines that the premises are unoccupied and therefore apparently safe for the intrusion.

In an endeavor to misinform intruders on such calls, telephone customers have heretofore made their phones busy by removing the telephone handset to its off-hook state. As a result, all subsequent calls to such phones receive a busy tone. While such a practice has proven satisfactory for customers in warding off undesired intrusions on their premises, it has proven to be a problem for telephone companies due to the permanent signal conditions which result from the prolonged off-hook phones. Among the principal objections to such permanent signals is that they result in the undesired tie-up of communication paths through the telephone switching network, peripheral service equipment, common control circuits and operators.

In view of the foregoing, it is apparent that a need exists for facilities which make customer telephones appear busy when they are absent from their premises and without the prolonged and objectionable tie-up of telephone office equipments and operators due to persistent off-hook phones.

SUMMARY OF THE INVENTION

In accordance with principles of my invention, auxiliary circuitry is provided for virtually eliminating permanent signals on a customer line during periods of customer absence. The circuitry is illustratively located on the customer premises for automatically making his phone appear busy only in response to incoming calls and thereafter for a timed period during which it is expected that a potential intruder would call back. The specific exemplary circuitry includes a detector relay which is activated by ringing current on an incoming call for connecting a bridge network to the called line for immediately tripping the ringing and thereby precluding the caller from hearing repeated ringing of the called station. Following the ring tripping, my circuitry is advantageously arranged to transmit a busy tone to the caller and then to effect a release of call connections when the calling party terminates the call. According to another feature of my invention, a timer circuit is activated by the ring detector relay for causing the bridge network to remain connected to the called line for a timed period after the ringing detection. Thus, when the calling party terminates the call, the bridge network causes a timed permanent signal condition to be automatically generated from the protected station for making it appear busy for a prescribed time interval to all subsequently received calls including those from a potential intruder. As a result, intruders are encouraged not to invade the premises with the busy phone. In addition, my invention eliminates the need for deliberate and persistent telephone off-hook conditions for making a customer phone appear busy when he is absent from his premises. My invention therefore reduces the objectionable tie-up of switching equipment and operators due to permanent signals heretofore caused by customers seeking to protect their unoccupied premises by deliberate prior art telephone off-hook practices.

A specific feature of my exemplary line busy circuitry is that a ring detector relay is responsive to an incoming call for connecting a resistor bridge across the customer line as an off-hook signal, the duration of which is controlled by timer circuitry. My illustrative timer circuitry includes a pair of relay timers each one of which is operative under control of the ring detector relay to time an individual portion of the time period that the resistor bridge off-hook signal is maintained on the customer line. It advantageously operates one of the timer relays at a time and, upon completion of an initial portion of the timing period by one of those relays and during a last portion of timing by the other timer relays, recycles the first one of the timer relays. This ordered arrangement of relay operations provides for accurate timing particularly for those instances where another incoming call is received on the protected customer line immediately after the removal of the timed resistor off-hook signal therefrom.

DRAWING DESCRIPTION

The invention, together with its various objects and features, can be easily understood from the following more detailed description of a specific illustrative embodiment thereof read in conjunction with the accompanying single sheet of a schematic and block diagram drawing of an exemplary relay line busy circuit.

It will be noted that the drawing employs a type of notation referred to as "detached-contact" in which an "X" represents a normally opened contact of a relay and a vertical bar represents a normally closed contact of a relay; "normally" referring to the unoperated condition of a relay. The principles of this type of notation are described in an article entitled "An Improved Detached-Contact-Type Schematic Circuit Drawing" by F. T. Meyer in the Sept., 1955 publication of the *American Institute of Electrical Engineers Transactions, Communications and Electronics*, Volume 74, pages 505–513.

DETAILED DESCRIPTION

In the drawing, there is shown a customer telephone 1 connected over a telephone line 2 extending to a telephone office 3. A line busy circuit 4 according to principles of my invention is also shown operably connectable to the telephone line 2 via a locking key contact 5. When a customer desires to have his phone 1 appear busy to incoming calls, he actuates and closes key contact 5.

Line busy circuit 4 comprises an alternating current (AC) relay RD and capacitor C for detecting conventional incoming call ringing. Such AC ringing is applied in a known manner in office 3 to tip and ring conductors 6 and 7 of line 2 and is then coupled via capacitor C and contact 5 through an upper winding of relay RD for causing its operation. In operating, relay RD immediately locks operated via a path from negative potential 10 through its lower winding and contacts RD–1 and SO2–1 to ground.

Circuit 4 also includes a bridge network including a resistor 8 and a busy tone source 9 which are connectable to line 2 via contact RD–2. When relay RD operates as priorly explained, contact RD–2 is closed to connect resistor 8 across tip and ring conductors 6 and 7 of line 2 for instantly tripping ringing and thereafter providing an off-hook signal and direct current (DC) bridge for holding call connections through office 3 toward the calling station in a known manner. Concurrently, the closure of contact RD–2 connects the busy tone source 9 to line 2 for applying a busy tone thereto for transmission over line 2 toward the calling telephone as a signal that the called phone 1 is busy.

After a receipt of the busy tone and a subsequent termination of the call to phone 1 by the calling party, call connections through telephone office 3 are released in a conventional manner while an off-hook signal remains applied to line 2 under control of resistor 8 and contact RD-2. The latter off-hook signal remains applied to line 2 under control of timer relays SO1, SO2 and B.

Following the release of the aforementioned call connections, the resistor 8 off-hook signal on line 2 causes a timed permanent signal condition to be originated and then processed in office 3. Typically, the off-hook signal is initially recognized in office 3 as a request for service and, consequently, line 2 is connected to a register (not shown) for returning dial tone and awaiting a receipt of customer transmitted call digits. When such digits are not received within a prescribed interval, line 2 is sequentially connected in office 3 to, for example, an announcement device (not shown), then an operator position (not shown) and finally to a howler tone source (not shown). In the meantime, all calls including those of a potential intruder which are directed to line 2 (while the resistor 8 off-hook signal remains connected thereto) receive a busy tone from office 3 in a conventional manner.

Busy circuit 4 advantageously includes a timer arrangement including a pair of timer relays SO1 and SO2 and a control relay B for controlling the busy tone transmission and the time period that the resistor 8 off-hook signal remains connected to line 2. Relays SO1 and SO2 are illustratively slow operate thermal devices. Timing is divided between relays SO1 and SO2 to provide an accurate time period. Relay SO1 is slow-operated to time an initial portion of the time period. Thereafter, relay SO1 is released and recycled under control of relay B and concurrently relay SO2 is slow-operated to time a last portion of the time period. The recycling, or cooling, of the thermal apparatus of relay SO1 during the SO2 relay timing is advantageously utilized so that accurate timing may be provided in the event that another incoming call is received on line 2 immediately following the SO1–SO2 relay timing and the removal of the resistor 8 off-hook signal as later described.

Relay SO1 timing is initiated upon the operation of relay RD. The latter operation causes the operate path of relay SO1 to be completed via contacts RD–3, B–1 and SO2–1 to ground. After that timing is completed, relay SO1 operates and, in turn, activates relay B via contact SO1–1. In operating, relay B locks via its contact B–2 and contact SO2–1 to ground and concurrently effects a release of relay SO1 by opening contact B–1. Relay SO1 then recycles. The operation of relay B also completes the obvious circuit via contact B–3 for a slow operation of relay SO2. When relay SO2 operates at the end of the time period, it opens contact SO2–1 for causing the release of relay B and RD. In releasing, relay B effects a release of relay SO2 for recycling its time determining thermal apparatus. The release of relay RD immediately disconnects busy tone source 9 and the resistor 8 off-hook signal from line 2 at contact RD–2. The latter action effects a release of the permanent signal equipment (not shown) in office 3 from line 2 and thereafter allows other calls to be extended through office 3 to line 2.

In view of the foregoing, it is apparent that the timed line busy according to my invention reduces the undesired tie-up of telephone office equipment and operators which were heretofore occasioned by prolonged and deliberate telephone off-hook practices. Customer utilization of my invention eliminates the need for permanent telephone off-hook conditions at unoccupied premises while providing customers with desired line busy conditions.

My invention is further arranged for enabling a customer at station 1 to recognize when the line busy circuit is in receipt of an incoming call. According to the illustrative embodiment, a buzzer BU is furnished to provide a humanly detectable signal upon the operation of relay RD in response to an incoming call on line 2. As a consequence, a customer is reminded of the line busy service and does not inadvertently block receipt of desired incoming calls. Buzzer BU operates for the duration of the first half of timing by the relay SO1. It operates over the path through contacts RD–3, B–1 and SO2–1 to ground. Upon a detection of a buzzer sound from buzzer BU, a customer at station 1 may open key contact 5 to deactivate the line busy circuit 4 and immediately proceed to answer the incoming call. In the event that the latter call is abandoned by the calling party before it is answered, the customer at phone 1 returns phone 1 to its on-hook state to await a receipt of subsequent calls. Buzzer BU is released following an opening of contact B–1 upon an operation of relay B as already described.

It is to be understood that the hereinbefore described arrangements are illustrative of the application of principles of my invention. In light of this teaching, it is apparent that numerous other arrangements may be devised by those skilled in the art without departing from the spirit and scope of the invention. Illustratively, it is within the scope of my invention to provide the timed busy feature without the busy tone source 9. In such an arrangement, a calling phone connected to line 2 encounters a silent condition on that line. The calling party usually terminates the call based on an assumption that the call was not completed, and immediately originates another call to line 2 only to encounter a timed busy condition as hereinbefore explained.

What is claimed is:

1. A line busy circuit for a communication line comprising
means operated in response to an incoming call for supplying a busy signal to said line for making said line appear busy to said call,
timer means responsive to the operation of said supplying means for defining a timed interval,
and means activated by said timer means for automatically controlling said supplying means upon an expiration of said timed interval to withdraw said busy signal from said line.

2. A line busy circuit in accordance with claim 1 wherein said supplying means includes means operated in response to incoming call ringing for connecting a busy tone to said line.

3. A line busy circuit in accordance with claim 2 wherein said supplying means further includes means controlled by said connecting means in response to said incoming call ringing for providing an off-hook signal on said line for tripping said ringing current and for holding said call on said line.

4. A line busy circuit in accordance with claim 3 wherein said off-hook signal providing means includes a resistor, and said connecting means includes a relay operated in response to said incoming call ringing current for connecting said resistor across said line to provide said off-hook signal for said timed interval.

5. A line busy circuit in accordance with claim 1 wherein said timer means comprises a first relay responsive to an operation of said supplying means for defining an initial portion of said timed interval, and
a second relay operable for defining a last portion of said timed interval.

6. A line busy circuit in accordance with claim 5 wherein said timer means further includes another relay activated by said first relay at the expiration of said initial portion of said timing interval for causing an operation of said second relay for defining said last portion of said time interval.

7. A line busy circuit in accordance with claim 6 further comprising signal means operable for providing a humanly detectable signal of the receipt of said call, and means responsive to said operation of said supplying means for operating said signal means, wherein said other relay includes means actuated upon the operation of said other relay for releasing said first relay and said signal means during the definition of said last portion of said timed interval.

8. A line busy circuit in accordance with claim 7 wherein said second relay includes means for releasing said supplying means upon an expiration of said timed interval to withdraw said busy signal from said line.

9. A line busy circuit in accordance with claim 5 wherein said supplying means includes
an electrical bridge network comprising a busy tone source and an off-hook signal device,
a ring detector relay responsive to incoming call ringing current for connecting both said tone source and said off-hook device to said line to make said line appear busy to said incoming call,
and wherein said first timer relay is responsive to an operation of said detector relay for defining said initial portion of said timed interval,
said second timer relay including means effective for holding said detector relay operated until after an expiration of said last portion of said timed interval, and said second relay means being operated at the expiration of said timed interval for releasing said detector relay to disconnect said tone source and off-hook device from said line.

10. In a telephone system having a telephone line, an electrical line termination device, means operated in response to a receipt of an incoming call on said line for connecting said termination device to said line, and means subsequently responsive to a termination of said call for effecting a busy condition of said line under control of said termination device connected thereto, the improvement comprising timer means responsive to said operation of said connecting means for defining a timed interval, and apparatus activated by said timer means at the expiration of said interval for controlling said connecting means to disconnect said termination device from said line to control a removal of said line busy condition.

* * * * *